US012591973B2

(12) United States Patent
Skrede et al.

(10) Patent No.: US 12,591,973 B2
(45) Date of Patent: Mar. 31, 2026

(54) HISTOLOGICAL IMAGE ANALYSIS

(71) Applicant: OSLO UNIVERSITETSSYKEHUS, Oslo (NO)

(72) Inventors: Ole Johan Skrede, Oslo (NO); Tarjei Sveinsgjerd Hveem, Oslo (NO); John Robert Maddison, Crowborough (GB); Havard Emil Greger Danielsen, Oslo (NO); Knut Liestol, Oslo (NO)

(73) Assignee: OSLO UNIVERSITETSSYKEHUS (NO)

( * ) Notice: Subject to any disclaimer, the term of this patent is extended or adjusted under 35 U.S.C. 154(b) by 0 days.

(21) Appl. No.: 18/636,747

(22) Filed: Apr. 16, 2024

(65) Prior Publication Data

US 2024/0296565 A1     Sep. 5, 2024

Related U.S. Application Data

(63) Continuation of application No. 17/743,642, filed on May 13, 2022, now Pat. No. 11,989,882, which is a continuation of application No. 16/763,860, filed as application No. PCT/EP2018/080828 on Nov. 9, 2018, now Pat. No. 11,361,442.

(51) Int. Cl.
 *G06T 7/00*                    (2017.01)
(52) U.S. Cl.
 CPC .. *G06T 7/0014* (2013.01); *G06T 2207/10024* (2013.01); *G06T 2207/10056* (2013.01); *G06T 2207/20021* (2013.01); *G06T 2207/20081* (2013.01); *G06T 2207/20084* (2013.01); *G06T 2207/30024* (2013.01)

(58) Field of Classification Search
 None
 See application file for complete search history.

(56) References Cited

U.S. PATENT DOCUMENTS

| | | | |
|---|---|---|---|
| 8,467,590 B2 | 6/2013 | Maddison et al. | |
| 9,922,272 B2 * | 3/2018 | Cheng | G06F 18/251 |
| 2012/0070055 A1 | 3/2012 | Liu et al. | |
| 2014/0201126 A1 * | 7/2014 | Zadeh | A61B 5/165 706/52 |
| 2014/0254900 A1 | 9/2014 | Sturm | |

(Continued)

FOREIGN PATENT DOCUMENTS

| | | | |
|---|---|---|---|
| WO | 2014140085 A1 | 9/2014 | |
| WO | 2016087592 A1 | 6/2016 | |

(Continued)

OTHER PUBLICATIONS

Wang Y., Lin J., Cui J., Han T., Jiao F., Meng Z., Wang L. Prognostic value and clinicopathological features of PD-1/PD-L1 expression with mismatch repair status and desmoplastic stroma in Chinese patients with pancreatic cancer. Oncotarget. 2017.*

(Continued)

*Primary Examiner* — Jiangeng Sun
(74) *Attorney, Agent, or Firm* — Billion & Armitage

(57)        ABSTRACT

A machine learning algorithm is trained on a number of microscopic images and a measure of outcome of each image. Each image is divided into tiles. The measure of outcome is assigned to each tile of the image. The tiles are then used to train the machine learning algorithm. The trained algorithm may then be used to evaluate images.

20 Claims, 7 Drawing Sheets

(56) References Cited

U.S. PATENT DOCUMENTS

| | | | |
|---|---|---|---|
| 2016/0063308 A1* | 3/2016 | Pauly | G06V 10/56 |
| | | | 382/128 |
| 2016/0093048 A1 | 3/2016 | Cheng et al. | |
| 2016/0098589 A1* | 4/2016 | Brieu | G06V 20/695 |
| | | | 382/128 |
| 2017/0076442 A1 | 3/2017 | Schoenmeyer et al. | |
| 2017/0337415 A1* | 11/2017 | Pauly | G06T 7/162 |
| 2017/0337682 A1 | 11/2017 | Liao et al. | |
| 2018/0053033 A1* | 2/2018 | Brieu | G06V 10/56 |
| 2018/0089534 A1 | 3/2018 | Ye | |
| 2018/0182099 A1* | 6/2018 | Lesniak | G06V 10/993 |
| 2019/0156159 A1* | 5/2019 | Kopparapu | G06F 18/24147 |

FOREIGN PATENT DOCUMENTS

| | | | | |
|---|---|---|---|---|
| WO | WO-2020243556 A1 * | 12/2020 | | G06V 10/454 |
| WO | WO-2021053135 A1 * | 3/2021 | | G06V 30/2504 |

OTHER PUBLICATIONS

International Search Report and Written opinion dated May 23, 2019.

L. Hou, D. et al. "Patch-Based Convolutional Neural Network for Whole Slide Tissue Image Classification," 2016 IEEE Conference on Computer Vision and Pattern Recognition (CVPR), Las Vegas, NV, 2016, pp. 2424-2433, doi: 10.1109/CVPR.2016.266.

Search Report for GB1718970.5, dated Mar. 28, 2018.

Vassili Kovalev et al: "Deep Learning in Big Image Data: Histology Image Classification for Breast Cancer Diagnosis", Big Data and Advanced Analytics, Proc. 2nd International Conference, BSUIR, Jun. 1, 2016 (Jun. 1, 2016), pp. 1-8, XP055533814.

Wang Haibo et al: "Mitosis detection in breast cancer pathology images by combining handcrafted and convolutional neural network features", Journal of Medical Imaging, Society of Photooptical Instrumentation Engineers, vol. 1, No. 3, Oct. 1, 2014.

Zhu, Xinliang , et al., "Deep Convolutional Neural Network for Survival Analysis with Pathological Images", 2016 IEEE International Conference on Bioinformatics and Biomedicine (BIBM), pp. 544-547.

* cited by examiner

HISTOLOGICAL IMAGE ANALYSIS

CROSS-REFERENCE TO RELATED APPLICATIONS

This application is a continuation of U.S. application Ser. No. 17/743,642, filed May 13, 2022, which is continuation of U.S. application Ser. No. 16/763,860, filed on May 13, 2020, which is a National Stage Application of International Application No. PCT/EP2018/080828, filed on Nov. 9, 2018, which claims benefit of Application No. 1718970.5, filed on Nov. 16, 2017 in Great Britain (GB) and which applications are incorporated herein by reference. A claim of priority to all, to the extent appropriate, is made.

FIELD OF THE INVENTION

This invention relates to analysis of histological images. It relates in particular to using a machine-learning algorithm to perform such analysis and also to training the machine-learning algorithm to perform the analysis.

BACKGROUND OF THE INVENTION

As used herein, a "histological image" refers to an image showing the microscopic structure of organic tissue. A "histological feature of interest" means a feature of this microscopic structure. The feature may be of interest for diagnostic or therapeutic purposes, or for scientific research, for instance.

Histological specimens are typically used to review the structure to determine the diagnosis or try to determine a prognosis.

In the case where the histological images relate to pathologies, the term "histopathological image" may be used.

At the microscopic scale, many of the interesting features of cells are not naturally visible, because they are transparent and colourless. To reveal these features, specimens are commonly stained with a marker before being imaged under a microscope. The marker includes one or more colorants (dyes or pigments) that are designed to bind specifically to particular components of the cell structure, thus revealing the histological feature of interest.

One commonly used staining system is called H&E (Haematoxylin and Eosin). H&E contains the two dyes haematoxylin and eosin. Eosin is an acidic dye—it is negatively charged. It stains basic (or acidophilic) structures red or pink. Haematoxylin can be considered as a basic dye. It is used to stain acidic (or basophilic) structures a purplish blue.

DNA (heterochromatin and the nucleolus) in the nucleus, and RNA in ribosomes and in the rough endoplasmic reticulum are both acidic, and so haematoxylin binds to them and stains them purple. Some extracellular materials (i.e. carbohydrates in cartilage) are also basophilic. Most proteins in the cytoplasm are basic, and so eosin binds to these proteins and stains them pink. This includes cytoplasmic filaments in muscle cells, intracellular membranes, and extracellular fibres.

Those skilled in the art will be aware of a number of alternative stains that may be used. Such histological images may be used in particular for evaluating tissues that may be cancerous. It is useful to be able to classify images to determine the expected outcome.

Conventionally, histological features of interest are identified in histological images by histopathologists—specialist medical experts trained in the interpretation of these images.

However, experiments have been carried out and the classification by histopathologists has been shown to be inconsistent and in many cases of limited prognostic value, both when comparing the identifications of different histopathologists and even when presenting the same images to the same histopathologist on different occasions. Such inconsistencies and inter and intra observer variability can have serious implications.

There is accordingly a need for an automated image analysis approach for carrying out this task.

One prior art approach to automated image analysis is taught by U.S. Pat. No. 8,467,590. This proposes the use of a variety of pre-determined statistical tests and analyses applied to an image and combines the measures to produce an output. However, it is difficult to design suitable automated image analysis methods and apparatus as there is a wide variety of potentially useful statistical tests and analyses that might in principle be used for analysing histological images and extensive research work and testing is often needed to identify the best approaches.

There is accordingly a need for improved automated histopathological image analysis methods and apparatus.

SUMMARY OF THE INVENTION

The invention is defined by the claims.

According to a first aspect of the invention, there is provided a computer-implemented method of training a machine-learning algorithm to perform histopathological image analysis, the method comprising:

obtaining, by the computer, a plurality of microscopic images of histological specimens and a measure of outcome for each of the images; dividing each of the plurality of microscopic images into a plurality of tiles; and training a machine-learning algorithm to generate a score representative of the outcome using as training inputs the plurality of tiles and the outcome for the respective image from which each tile is divided.

By using a machine-learning algorithm the need for research work to identify suitable image analysis methods for histological images is avoided. Surprisingly, it is possible to obtain a useful trained machine-learning algorithm by dividing each of the plurality of microscopic images into tiles and ascribing the same measure of outcome to each of the tiles of the image.

The number of tiles may be relatively large—each microscopic image may be divided into at least 250 tiles, further preferably at least 500 tiles. Each of these tiles is deemed for training purposes to share the same outcome. Thus, a relatively limited number of microscopic images may generate a large number of tiles that may be used for training the algorithm.

It will be appreciated that the tiles of a single image will vary and even in the case of a specimen which results in a poor outcome many of the tiles may well show no evidence of this. For example, where the microscopic images are of potentially cancerous tissue sections, any cancer present will only be present in some regions of the microscopic images and hence only some tiles will include images of such tissue. The remainder of the tiles will not contribute to the outcome of the case-indeed the remainder of the tiles may show normal tissue. There will therefore be many tiles where there is no indication of any particular relevant pathology for the classification of the case. Nevertheless, the machine learning algorithm is trained using the same outcome associated with all tiles of a microscopic image. This means that the machine-learning algorithm will be trained with many tiles showing no obvious relevant structure even when there is a poor outcome. There is therefore no clear one-to-one correspondence between the contents of a tile and the outcome.

At first sight, therefore, it is not clear that a machine-learning algorithm can be trained on individual tiles being parts of histological images to produce any kind of useful output.

However, the inventors have carried out experiments and even in spite of this issue it turns out that reliable and useful results can be obtained. In general, machine learning algorithms trained to provide an output for each tile will provide an output for a test image for the tiles of that image, which is not what is required. Normally, to train a machine learning algorithm to provide an output for an image, the machine learning algorithms will be trained using training data comprising the images and the outcome corresponding to the image. However, this may cause difficulties in view of the need for very large numbers of images and the very large size of each of these images which can cause problems for machine learning algorithms and available hardware limitation since the algorithm will need to determine itself which of the very large number of features represented by the pixels of the image are useful. The inventors have realised that it is possible to provide a useful training to output data for a complete image even if the machine-learning algorithm is trained on individual tiles.

In some embodiments, a single score is obtained for a complete image by thresholding. To explain further, the single predicted outcome value for an image may be achieved by double thresholding each of the scores. Each of the plurality of scores is compared with a first threshold value, and the number of scores above (or below) the first threshold value may be counted, representing the number of tiles of the image with scores above (or below) the first threshold. Then, this number of scores may be compared with a second threshold value, and the single predicted outcome value may be a binary value (representing good/bad) depending on whether the number of scores is above or below the second threshold value. Accordingly, the method may further include determining a first threshold value and a second threshold value, by for the plurality of microscopic images, comparing each of the outcome scores of the plurality of tiles with a first threshold value, counting the number of scores above or below the first threshold value; and comparing the counted number of scores with a second threshold value to obtain a binary single predicted outcome value depending on whether the counted number of scores is above or below the second threshold; and optimising the first and second threshold values to minimise the variance between the binary single predicted outcome value and the respective measure of outcome for the plurality of images. The resulting computer implemented trained machine learning algorithm provides a useful means for analysing histopathological images and providing useful outputs which can be used to guide medical decision-making. Indeed, it is possible to supply a data carrier or computer with the trained machine learning algorithm implemented upon it to medical facilities with limited numbers of trained staff to provide high quality histopathological analysis to such medical facilities.

According to a second aspect of the invention, there is provided a computer-implemented analysis method for histopathological image analysis, using a machine-learning algorithm trained according to a method as summarised above, the analysis method comprising:

obtaining, by the computer, a test microscopic image of a histological specimen that has been stained with the marker;

providing, by the computer, the trained machine-learning algorithm; dividing the first microscopic image into a plurality of tiles;

evaluating the plurality of tiles using the trained machine-learning algorithm to deliver a plurality of scores corresponding to the plurality of tiles; and outputting a representation of the plurality of scores for the test microscopic image.

The trained machine-learning algorithm can perform surprisingly better than a human expert at this task.

In one embodiment, the step of outputting a representation of the plurality of scores includes outputting an image of the tiles and a visual representation of each of the scores. In a particular embodiment, the visual representation of each tile is a grey scale or colour corresponding to the score to generate a "heat map" of the test microscopic image, i.e. an image corresponding to the test microscopic image but with each tile represented by a grey-scale or colour value corresponding to the score. For example, red may be used for high scores, blue for low scores, and orange, yellow and green used for intermediate scores. This allows the visual representation to indicate to the viewer where in the original test image potentially dangerous tissue may be present. The viewer may then examine these parts of the original image more closely.

The measure of outcome used in the training algorithm is typically a binary value (for example representing good and bad outcomes) or alternatively has only a few potential values (for example good/average/bad). Surprisingly, even with such a limited range of outcomes each applied to not just a single tile but to all tiles of an image, it is still possible to generate as the output of the computer-implemented method for histopathological image analysis a "heat map" showing where the tissue may show pathological features. In other words, the trained machine-learning outputs can generate useful information that goes beyond the simple good/bad (or similar) outcome information used in the training inputs.

In another embodiment, the step of outputting a representation of the plurality of scores includes outputting a single outcome value obtained by combining the plurality of scores to achieve a single predicted outcome value of the test microscopic image. This single predicted outcome value represents the whole of the test microscopic image and provides a simple representation of the image.

Note that in some embodiments the score output by the machine-learning algorithm for the respective tiles is a single number which can take any of a range of values, while in many practical applications the measure of outcome may typically be a simple binary value (good/bad). During the training process of the machine-learning outcome, the same first threshold value may be used to turn the score representing the tile into a simple binary value (good/bad) for comparing with the respective measures of outcome. In this case, the score output by the machine-learning algorithm provides additional information which may be considered to represent how "sure" the machine-20 learning algorithm is about the result.

In a particularly preferred embodiment, the step of outputting a representation of the plurality of scores includes outputting both a visual representation of each of the scores and the single predicted outcome value. In embodiments, the machine learning algorithm is a neural network. In a particular embodiment, a convolutional neural network is used.

In a preferred embodiment, the method includes obtaining the plurality of microscopic images of histological specimens that have been stained with a marker using at least two different pieces of image scanning equipment. By avoiding the use of a single piece of image scanning equipment, the trained machine-learning algorithm is not trained to use only the images from that single piece of image scanning equipment, and accordingly the trained machine-learning algorithm should be more capable of processing images from different pieces of image scanning equipment.

In the case that different pieces of image scanning equipment are used, the method may further include a step of aligning the images. This may be done by a scale-invariant feature transform, generally referred to as a SIFT transform, for example.

Each microscopic image is preferably a grayscale or colour image consisting of one, two or three colour channels. Most preferably, it is a colour image consisting of three colour channels. Thus, it provides three samples for each pixel. The samples are coordinates in a three-dimensional colour space. Suitable 3-D colour spaces include but are not limited to RGB, HSV, YCbCr, and YUV.

The method may further comprise obtaining, by the computer, a region of interest in each of the first microscopic images, the method comprising training the machine-learning algorithm with said regions of interest and excluding from the training any regions other than said regions of interest.

In some embodiments, the region of interest may be generated by the computer for example, using an image segmentation algorithm. In some embodiments, the region of interest may be input by a user, such as a histopathologist. In some embodiments, the region of interest may be generated semi-automatically, with some user input combined with some image segmentation by the computer. The first marker may comprise haematoxylin and eosin.

Haematoxylin and Eosin (H&E) dye is relatively cheap and widely used in the art to stain histological specimens. It is particularly advantageous to be able to perform, using images of H&E-stained specimens, histopathological analysis that could previously only be performed with other, more expensive, or more time consuming marking techniques. Such analysis can be performed according to embodiments of the present invention. In one embodiment, the step of outputting a representation of the plurality of scores includes outputting an image of the tiles and a visual representation of each of the scores. In a particular embodiment, the visual representation includes a grey scale or colour corresponding to the score to generate a heat map of the test microscopic image.

In another embodiment, the step of outputting a representation of the plurality of scores includes outputting an outcome score in the form of a single data point representing the test microscopic image, the single data point being obtained by combining the plurality of scores to achieve an overall score for the test microscopic image. In one embodiment, the single data point outcome score may be achieved by thresholding each of the scores output by the machine learning algorithm for the tiles of the image, using the first and the second thresholds as described above.

In an alternative embodiment, the single data point outcome score may use the first threshold only, by outputting the number of tiles of the test image which exceed (or which do not exceed) the first threshold.

The method may further comprise conducting, by the computer, automated analysis of the heat map and the single output data point. Also disclosed is a computer program product comprising a non-transitory computer-readable medium having embodied thereon a computer program comprising computer program code configured to control a computer to execute all the steps of a method as summarised above when said computer program is run on the computer. Also disclosed is a histopathological image analysis apparatus comprising: a computer-readable storage medium;

a memory;

one or more interfaces; and a processor configured to perform a method as summarised above.

BRIEF DESCRIPTION OF THE DRAWINGS

The invention will now be described by way of example with reference to the accompanying drawings, in which.

DETAILED DESCRIPTION

Figure 1:
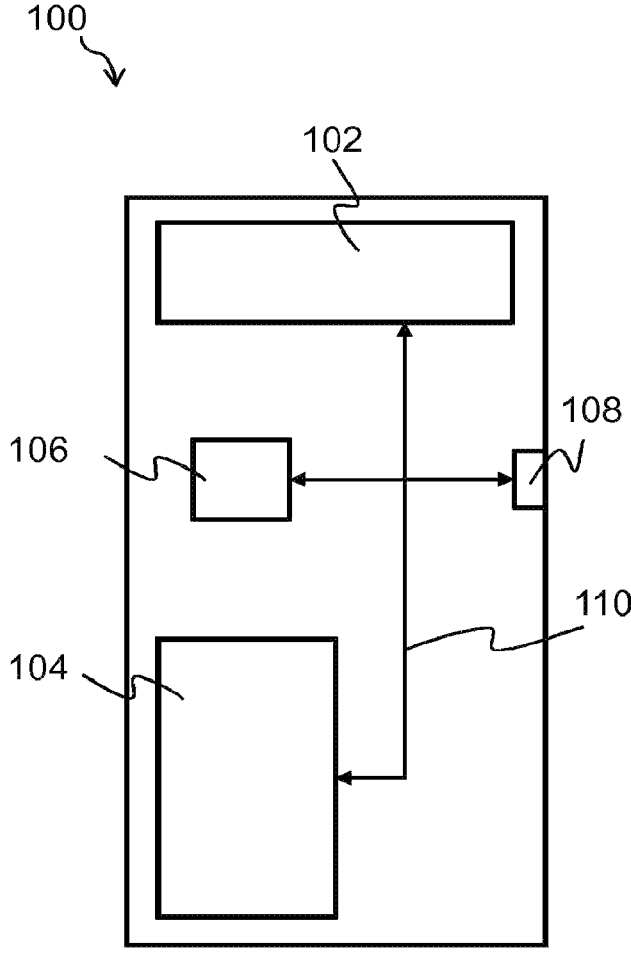
FIG. 1 is a block diagram schematically illustrating an exemplary computer system upon which embodiments of the present invention may run.

FIG. 1 of the accompanying drawings schematically illustrates an exemplary computer system 100 upon which embodiments of the present invention may run. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on. In some embodiments, it may be embedded in a microscopy apparatus, such as a virtual slide microscope capable of whole slide imaging.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention.

The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. In a particularly preferred embodiment, the processor 106 may comprise one or more Graphics Processing Units (GPUs). GPUs are well suited to the kinds of calculations involved in training and using machine-learning algorithms such as those disclosed herein. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

According to embodiments of the invention, the interface 108 may alternatively or additionally comprise an interface to a digital microscope or other microscopy system. For example, the interface 108 may comprise an interface to a virtual microscopy apparatus capable of Whole Slide Imaging (WSI). In WSI, a virtual slide is generated by high-resolution scanning of a glass slide by a slide scanner. The scanning is typically done piecewise and the resulting images are stitched together to form one very large image at the highest magnification of which the scanner is capable. These images may have dimensions of the order of 100,000×200,000 pixels—in other words, they may contain several billion pixels. According to some embodiments, the computer system 100 may control the microscopy apparatus through the interface 108 to scan slides containing specimens. The computer system 100 may thus obtain microscopic images of histological specimens from the microscopy apparatus, received through the interface 108. It will be appreciated that the architecture of the computer system 100 illustrated in FIG. 1 and described above is merely exemplary and that systems having different architectures using alternative components or using more components (or fewer) may be used instead.

Figure 2:
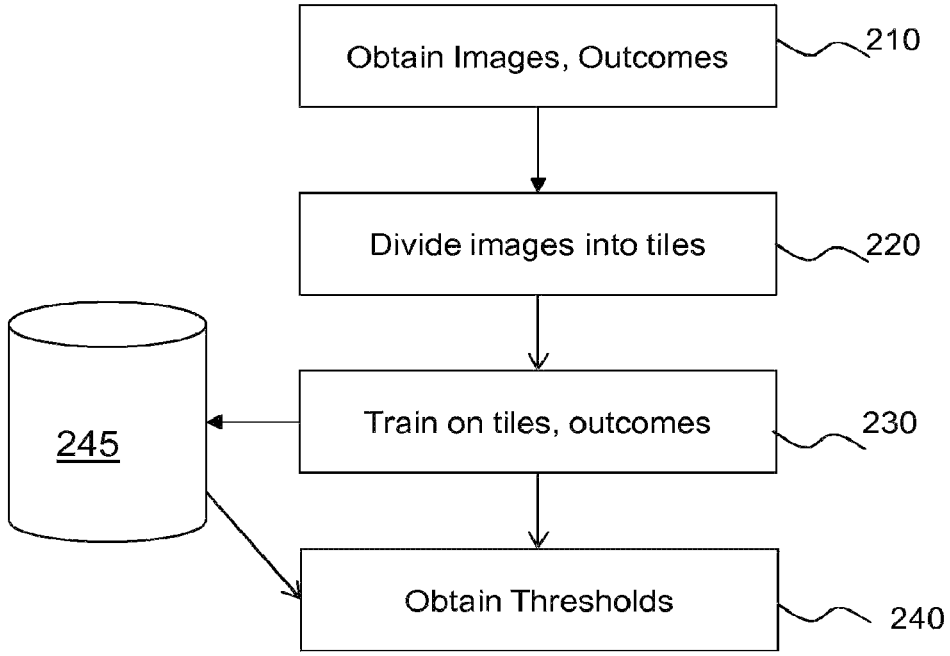
FIG. 2 is a flowchart of a method of training a machine-learning algorithm, according to an embodiment of a first aspect of the invention.

FIG. 2 is a flowchart showing a method of training a machine-learning algorithm to perform histopathological image analysis, according to an embodiment of a first aspect of the invention. The method uses a set of training images to train the algorithm to detect a histological feature of interest. In particular, it trains the algorithm to detect, in images stained with one marker, a histological feature that is usually detected (and typically is more easily detectable by a human expert) in images stained with another, different marker.

In step 210, the computer 100 obtains a plurality of first colour microscopic images of microscopic images of histological specimens that have been stained with a marker.

The colour images may be obtained by controlling a Virtual Microscope (VM) to scan slides containing the specimens. One suitable group of virtual microscopes is sold by Hamamatsu Photonics of Japan, under the product name "NanoZoomer". The virtual microscope comprises microscope optical components, a stage for mounting the specimen to be examined, a Charge-Coupled Device (CCD) array or other electronic imaging device for receiving the image of the specimen, a computer for processing the image and a Visual Display Unit (VDU) for displaying the image and other data. A prepared slide containing a slice of biological tissue is scanned by the virtual microscope to produce a respective first colour microscopic image. For each point (pixel) on the image, the CCD array includes red, green, and blue wavelength detectors, providing respective red, green, and blue signals. Thus, the virtual microscope produces a colour image consisting of three colour channels. In the present example, the maximum magnification provided by the virtual microscope corresponds to approximately a 40× objective optical microscope lens when used on a standard bright field microscope.

Other ways of obtaining the images are also possible. Indeed, in the training phase, these microscopic slides from which the images are obtained should the outcomes for the individual patients are known. The images are then paired up with a value indicating an outcome such as cancer-specific survival time and provided to the computer 100.

In a preferred embodiment, the images are obtained on a variety of different pieces of scanning equipment. This is so that in the subsequent training phase the machine learning algorithm is not trained on features specific to a particular piece of scanning equipment. In this way, the trained machine learning algorithm may have more general applicability The annotation as drawn on one scan can be transferred to another by the use of a scale-invariant feature transform, generally referred to as a SIFT transform, for example.

Figure 7:
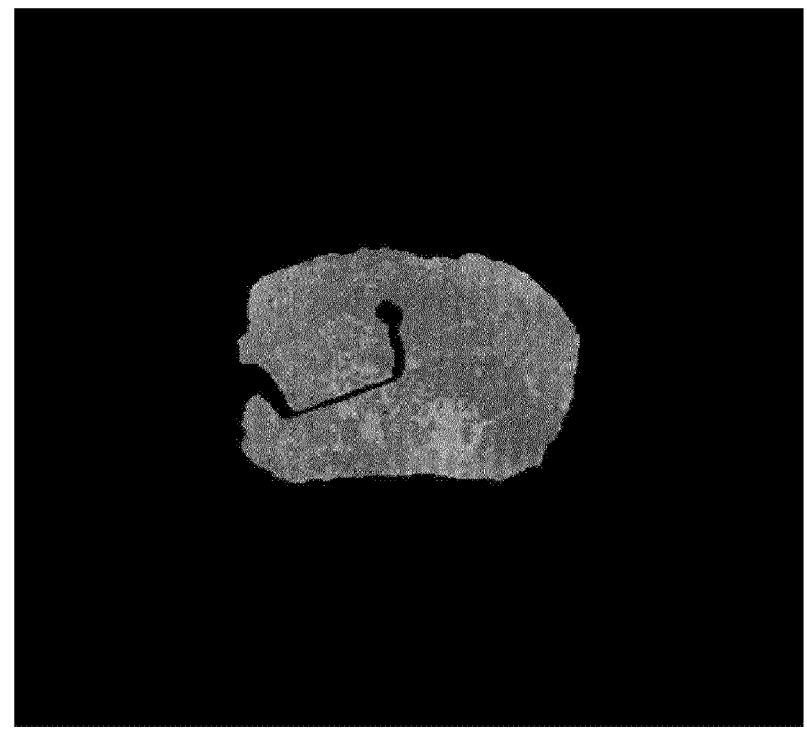
FIG. 7 is a photomicrograph corresponding to a good outcome.
Figure 8:
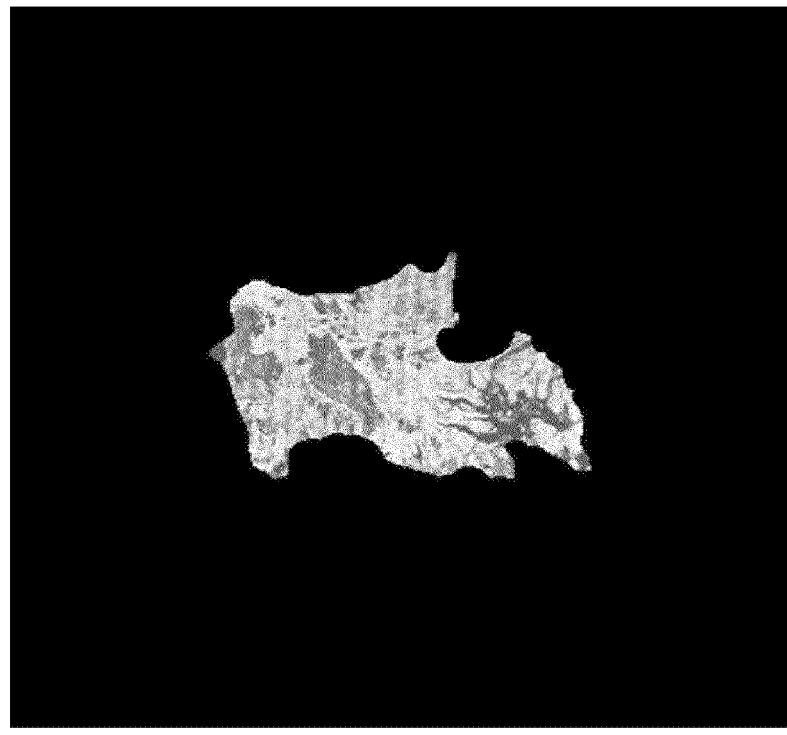
FIG. 8 is a photomicrograph corresponding to a poor outcome.

Examples of the images captured, in black and white, are presented in FIGS. 7 and 8. FIG. 7 is an example of an image corresponding to a good outcome and FIG. 8 is an example of an image corresponding to a poor outcome.

In step 220, the images are divided into tiles, typically at least 250 and in embodiments 500 or 1 000 tiles or more. Each tile is assigned the outcome of the individual image. In step 230, a machine learning algorithm is trained on the tiles (not the whole image) and the outcomes. The large number of tiles compared with images creates a significant dataset to be used to train the algorithm.

In the specific embodiment, the machine learning algorithm is a neural network, in particular a convolutional neural network. However, other machine learning algorithms may be used, for example other designs of neural network.

This step generates a trained neural network algorithm 245. In one arrangement, the outcome score output by the trained neural network algorithm 245 is a binary number representing a good/bad outcome which can be directly compared with a binary good/bad However, in a preferred embodiment, the outcome score of the trained neural network for each tile is a number that can take more than two values, i.e. a number on a scale representing good or bad the outcome based on the image content of the tile.

However, a further step is taken during this training phase in this specific embodiment. The outcome score of the trained neural network algorithm 245 is an output for each tile. However, in a subsequent step of using the algorithm 245 to evaluate an image, there is a need for an output for each image, not just each tile, as will be described later. In order for this output to be generated, it is necessary to obtain thresholds, as will now be explained.

Figure 3:
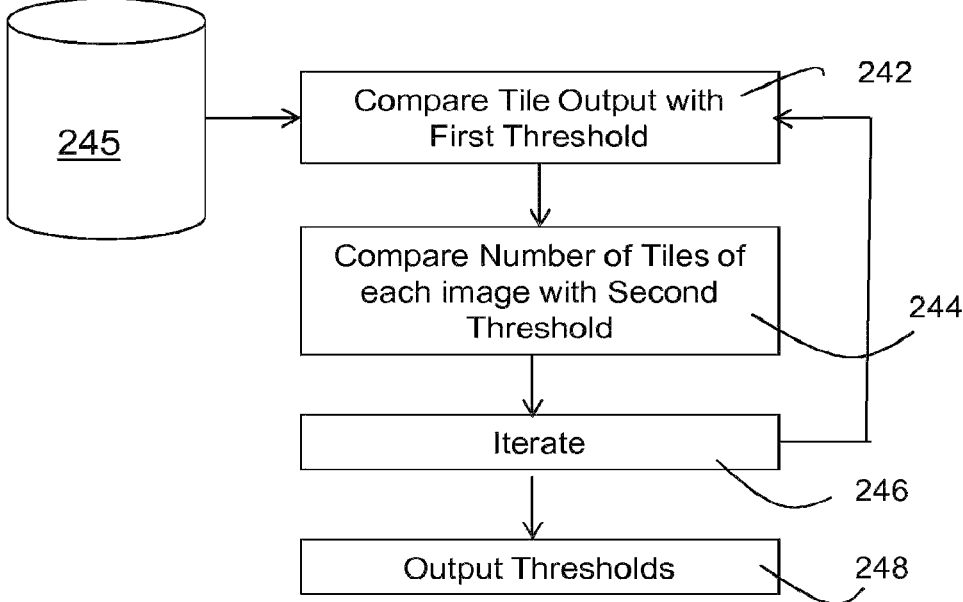
FIG. 3 is a flowchart of a method of optimisation used in the method of FIG. 2.

In order to provide a single outcome score for each image in step 240 a first threshold and a second threshold are obtained. This is done by an optimization process, automatically adjusting the first and second thresholds to obtain the best results. The optimisation process is illustrated in FIG. 3.

In essence, the optimisation works by calculating a single output for each of the input images. In a first step 242, for each of the tiles of each the microscopic images used for training the output of the trained neural network algorithm 245 is compared with a first threshold, giving an essentially binary value for each tile (good/bad). In a second step 244, for each image, the number of tiles having one of the binary values is compared with a second threshold, giving an essentially binary value for the image as a whole.

This process is repeated (step 246) varying the first and second thresholds until the best match to the outcomes input in step 210 is obtained, and the first and second thresholds are then output (step 248).

Such optimization may use Nelder-Mead, quasi-Newton or conjugate gradient algorithms. The function to be optimized is the difference between the trained machine learning output for each training image and the single predicted outcome value calculated by the trained machine-learning algorithm for each respective image. Since this optimization only requires the selection of two variables (the first and second threshold values) and the calculations are only required for a relatively small number of training images, in contrast to the relatively large number of tiles, there is no need for the use of neural network techniques, though they may be used as an alternative if desired.

A conventional optimisation approach can be used. Such conventional optimisation algorithms are known in the art and will not be described further. For example, the optimisation algorithm described at https://stat.ethz.ch/R-manual/R-devel/library/stats/html/optim.html may be used.

Alternatively, the determination of the first and second thresholds may be carried out at a later stage, not during the same process as generating the trained neural network machine-learning algorithm.

Figure 4:
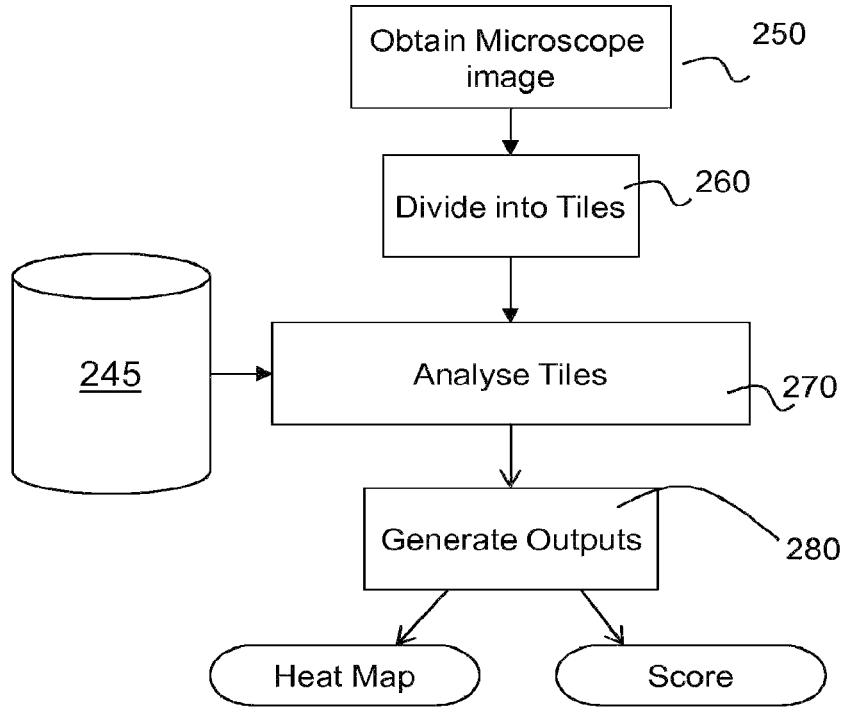
FIG. 4 is a flowchart showing a method for histopathological image analysis, according to an embodiment of a second aspect of the invention.

The use of the trained database will now be discussed with reference to FIG. 4.

Firstly, a histological microscopic test image is obtained (step 250) and input into computer 100. The area of the tumour is delineated. In the specific examples presented below, this step was carried out by a pathologist. However, in alternative embodiments, this step may also be automated. Then, the test image is divided into a plurality of tiles (step 260).

For each of the tiles, the trained neural network 245 is used to provide the outcome score for each tile, in the form of a number on a scale (Step 270).

The outputs are then generated. In this embodiment, there are two outputs, a heat map and a single overall score.

To generate the heat map, i.e. a digital image, a representation of the outcome of each tile is used. An image is created of the tiles, arranged as they are in the individual image, and for each tile the colour of the tile in the heat map represents the outcome score. For example, a high score may be represented by a white or yellow colour, and a low score by a blue or green colour.

In alternative embodiments, a grey scale may be used in which high scores are represented by white, low scores by black, and intermediate scores by shades of grey, or alternative mappings may also be used.

Such a heat map gives the user an indication of where in the image potentially relevant pathological tissue may be present.

To generate the overall score, the outcome score for each of the tiles of the test image is compared with the first threshold obtained in step 240, giving an essentially binary value for each tile (good/bad). Then the number of tiles having one of the binary values is compared with the second threshold, giving an essentially binary value for the image as a whole, which is output together with the heat map.

In alternative embodiments, only one of these outputs or alternative outputs may be provided as long as they represent the outcomes of the tiles of the image.

Figure 5:
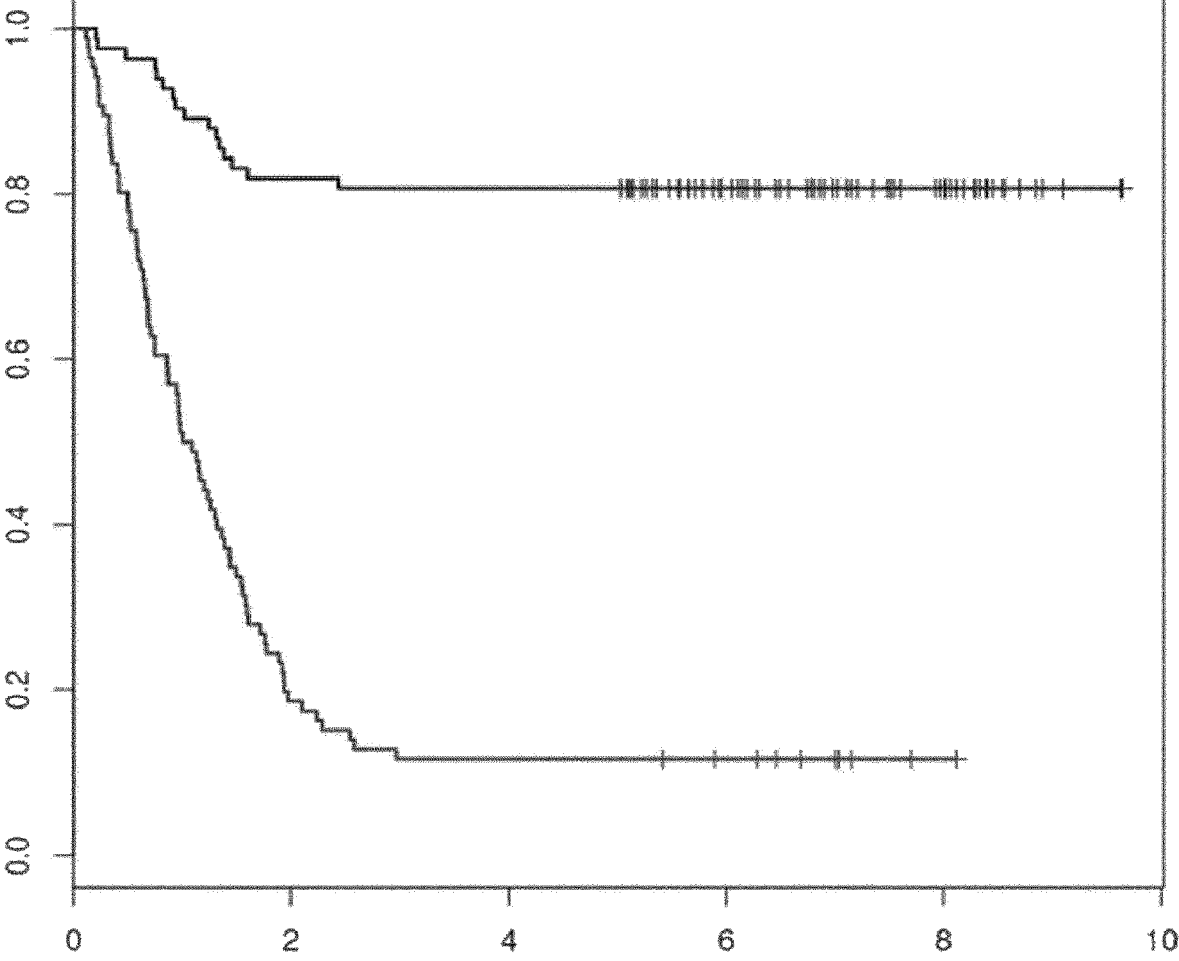
FIG. 5 is a chart of patient outcomes for training data.
Figure 6:
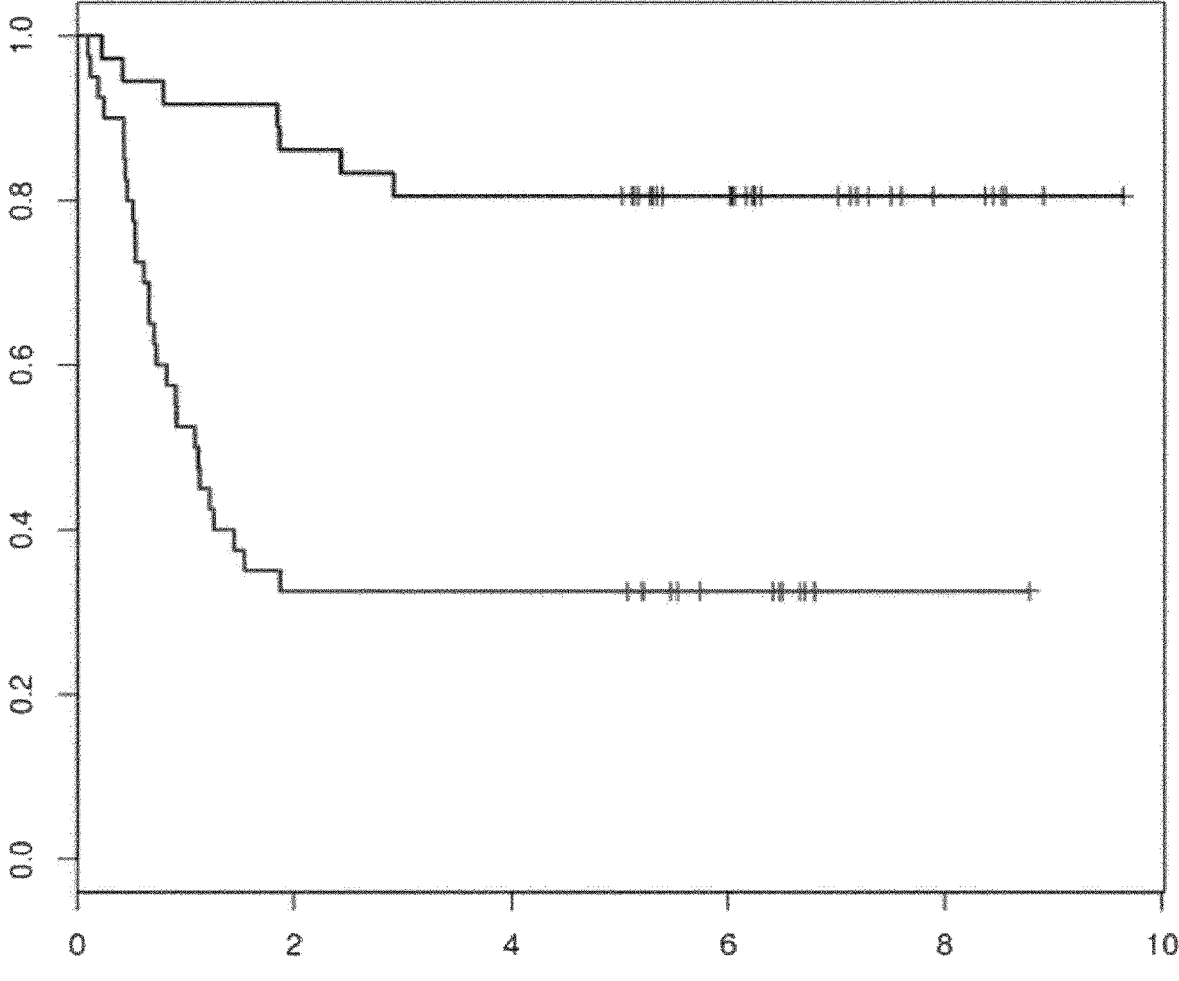
FIG. 6 is a chart of patient outcomes for input data.

This approach was trialed with a dataset for which patient outcomes are already known, and the results presented with reference to FIGS. 5 and 6.

In a first embodiment, the above method and apparatus was used to train a convolutional neural network with 169 training microscopic images, corresponding to 169 patients of which 83 had good outcomes and 86 poor outcomes. Note that the images created from specimens obtained from cases where outcomes for the individual patients are accordingly known. The images were colour representations (RGB) of H and E stains of tissue sections from the colons of the 169 patients.

After the training, the trained neural network was used to predict outcomes for the same 169 images. The predicted outcome was compared with cancer-specific survival for a number of years as illustrated in FIG. 5. As expected, when presented with the same patients and same images on which the neural network was trained, the patients for which a good outcome was predicted had much better outcomes than the patients for which a poor outcome is predicted.

Of course, this result is expected and does not demonstrate the utility of the trained neural network for other data.

Accordingly, the same trained neural network was used to evaluate a further 76 patients that had not been not used in the training. The predicted outcome (good or poor) was predicted for each patient, resulting in a prediction of a good outcome for 36 patients and a poor outcome for 40 patients. This was then compared with the cancer-specific survival as illustrated in FIG. 6. Even with these different patients, the predictions clearly have considerable merit and the long term outcome for patients predicted to have poor outcomes is considerably worse (less than 40% survived 5 years) than for patients predicted to have good outcomes (80% survived 5 years).

This demonstrates that the trained neural network had useful predictive value.

Note that unlike prior art approaches in which the relevant features of the images were obtained by humans, in the present case all the information that was used to train the neural network was the three-colour images of the stained section. The only human intervention in the example above was to select the area of the tumour. Alternatively, this step too can be automated. Thus, this approach makes it easier to obtain useful test analysis as there is no need for a skilled user to identify relevant features of images. While the invention has been illustrated and described in detail in the drawings and foregoing description, such illustration and description are to be considered illustrative or exemplary and not restrictive; the invention is not limited to the disclosed embodiments.

In some embodiments, the method of training the machine-learning algorithm may be implemented in an iterative fashion. The computer 100 may obtain a single first colour microscopic image and a single corresponding second colour microscopic image at a time. The computer may process this pair of images and may then check whether a sufficient number of images has been obtained to train the machine-learning algorithm. If not, the computer may repeat the process for a further pair of images. This procedure is repeated until the machine-learning algorithm is fully trained, at which point the iterations stop.

Of course, those skilled in the art will appreciate that controlling a virtual microscope to scan slides is not the only way for the computer 100 to obtain colour microscopic images. Libraries of suitable images may already be available from other sources. However, it is noted that training methods according to embodiments of the present invention require the existence of two corresponding sets of slide-images-one set in which the specimens are stained with a first marker and a second set in which the specimens are stained with a second marker.

Correspondingly, in the examples described above, the microscopic images were colour microscopic images consisting of three colour channels. In other embodiments, such as those using fluorescent dyes, either or both of the microscopic images may have fewer than three colour channels. In particular, the microscopic images may be grayscale images, consisting of a single channel, or they may be two-channel images.

Although the steps of the training method were described above in a particular order with reference to FIG. 2, in general the steps need not be carried out in this order.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A computer-implemented method of training a machine-learning algorithm to perform histological image analysis, comprising:
   obtaining, by a computer, a plurality of histological images and a measure of outcome for each of the images;

dividing each of the plurality of histological images into a plurality of tiles;

training a machine-learning algorithm to generate a score for an image tile using as training inputs all of the plurality of tiles of the histological images;

combining the plurality of scores for the plurality of tiles in a histological image to generate a single predicted outcome value for the histological image;

optimising the way in which the plurality of scores are combined in order to minimise the variance between the single predicted outcome value and the respective measure of outcome for the plurality of histological images, and wherein:

training the machine-learning algorithm comprises training the machine-learning algorithm with images from a first image scanning equipment and modified copies of the images to jointly minimize the variance between the single predicted outcome value and the respective measure of outcome for the plurality of histological images.

2. The computer-implemented method of claim 1, further comprising:
   obtaining the plurality of histological images of the same object using at least two different pieces of image scanning equipment.

3. The computer-implemented method of claim 1, wherein the plurality of histological images have been stained with a marker.

4. The computer-implemented method of claim 3, wherein the marker comprises Haematoxylin and Eosin.

5. The computer-implemented method of claim 2, further comprising:
   aligning the plurality of histological images obtained using at least two different pieces of image scanning equipment such that a same object in images provided by the at least two different pieces of image scanning equipment is aligned.

6. The computer-implemented method of claim 1, wherein the machine-learning algorithm is a neural network.

7. The computer-implemented method of claim 6, wherein the neural network is a convolutional neural network.

8. The computer-implemented method of claim 1, wherein each of the plurality of histological images is divided into at least 200 tiles.

9. The computer-implemented method of claim 1, wherein the histological image analysis is histopathological image analysis.

10. The computer-implemented method of claim 1, wherein the single predicted outcome value and the measure of outcome represent a prognostic outcome for cancer patients.

11. The computer-implemented method of claim 1, wherein the single predicted outcome value and the measure of outcome represent risk of cancer-specific death.

12. A computer-implemented method of training a machine-learning algorithm to perform histological image analysis, comprising:
   obtaining, by a computer, a plurality of histological images of a same object using at least two different pieces of image scanning equipment and a measure of outcome for each of the images;
   aligning the plurality of histological images obtained using at least two different pieces of image scanning equipment such that a same object in images provided by the at least two different pieces of image scanning equipment is aligned;

dividing each of the plurality of histological images into a plurality of tiles;

training a machine-learning algorithm to generate a score for an image tile using as training inputs all of the plurality of tiles of the histological images;

combining the plurality of scores for the plurality of tiles in a histological image to generate a single predicted outcome value for the histological image; and optimising the way in which the plurality of scores are combined in order to minimise the variance between the single predicted outcome value and the respective measure of outcome for the plurality of histological images, wherein:

training the machine-learning algorithm comprises jointly minimizing the variance between the single predicted outcome value and the respective measure of outcome for the plurality of histological images.

13. The computer-implemented method of claim 12, wherein the plurality of histological images have been stained with a marker.

14. The computer-implemented method of claim 13, wherein the marker comprises Haematoxylin and Eosin.

15. The computer-implemented method of claim 12, wherein the machine-learning algorithm is a neural network.

16. The computer-implemented method of claim 15, wherein the neural network is a convolutional neural network.

17. The computer-implemented method of claim 12, wherein each of the plurality of histological images is divided into at least 200 tiles.

18. The computer-implemented method of claim 12, wherein the histological image analysis is histopathological image analysis.

19. The computer-implemented method of claim 12, wherein the single predicted outcome value and the measure of outcome represent a prognostic outcome for cancer patients.

20. The computer-implemented method of claim 12, wherein the single predicted outcome value and the measure of outcome represent risk of cancer-specific death.

* * * * *